United States Patent
Platt

(10) Patent No.: US 9,199,448 B2
(45) Date of Patent: Dec. 1, 2015

(54) IMAGING DRUM SURFACE EMISSIVITY AND HEAT ABSORPTION CONTROL METHODS, APPARATUS, AND SYSTEMS FOR REDUCTION OF IMAGING DRUM TEMPERATURE VARIATION

(75) Inventor: David Paul Platt, Newburg, OR (US)

(73) Assignee: Xerox Corporation, Norwalk, CT (US)

( * ) Notice: Subject to any disclaimer, the term of this patent is extended or adjusted under 35 U.S.C. 154(b) by 883 days.

(21) Appl. No.: 13/313,994

(22) Filed: Dec. 7, 2011

(65) Prior Publication Data

US 2013/0145944 A1 Jun. 13, 2013

(51) Int. Cl.
| | |
|---|---|
| B41J 2/175 | (2006.01) |
| B41J 2/01 | (2006.01) |
| G01D 11/00 | (2006.01) |
| B41J 2/005 | (2006.01) |
| C09D 11/34 | (2014.01) |

(52) U.S. Cl.
CPC ............ *B41J 2/0057* (2013.01); *B41J 2/17593* (2013.01); *C09D 11/34* (2013.01); *B41J 2/01* (2013.01)

(58) Field of Classification Search
CPC ...... B41J 2/17593; B41J 2/005; B41J 2/0057; B41J 11/04; B41J 13/02; B41J 13/06; C09D 11/34; B41F 27/105; B41F 13/10; B41F 13/22; B41F 31/002
USPC .................... 347/88, 99, 101, 103, 104, 105; 101/375, 487
See application file for complete search history.

(56) References Cited

U.S. PATENT DOCUMENTS

| | | | | |
|---|---|---|---|---|
| 2,029,220 A | * | 1/1936 | Brawn ........................ | 101/401.1 |
| 3,325,319 A | * | 6/1967 | Frantzen ........................ | 216/56 |
| 4,028,118 A | * | 6/1977 | Nakasuji et al. ........... | 106/31.19 |
| 4,042,804 A | * | 8/1977 | Moser .......................... | 219/216 |
| 5,153,411 A | * | 10/1992 | Ndebi .......................... | 219/216 |
| 5,389,958 A | * | 2/1995 | Bui et al. ..................... | 347/103 |
| 5,614,933 A | * | 3/1997 | Hindman et al. ............ | 347/103 |
| 5,724,639 A | * | 3/1998 | Tamura et al. ................ | 399/333 |
| 5,974,294 A | * | 10/1999 | Tange .......................... | 399/328 |
| 6,118,969 A | * | 9/2000 | Curry et al. .................. | 399/334 |
| 6,494,570 B1 | * | 12/2002 | Snyder ......................... | 347/103 |
| 6,713,728 B1 | * | 3/2004 | Justice et al. ................ | 219/469 |
| 6,742,884 B2 | * | 6/2004 | Wong et al. ..................... | 347/99 |
| 6,983,692 B2 | * | 1/2006 | Beauchamp et al. ......... | 101/409 |
| 7,460,822 B2 | | 12/2008 | Potter et al. | |
| 7,511,249 B2 | * | 3/2009 | Begeal et al. ................ | 219/216 |
| 7,532,848 B2 | * | 5/2009 | Potter et al. .................. | 399/330 |
| 7,653,338 B2 | * | 1/2010 | Kim et al. ..................... | 399/330 |
| 7,725,050 B2 | * | 5/2010 | Li et al. ......................... | 399/96 |
| 7,792,475 B2 | * | 9/2010 | Seol .............................. | 399/329 |

(Continued)

FOREIGN PATENT DOCUMENTS

JP 06218913 A * 8/1994

*Primary Examiner* — Julian Huffman
*Assistant Examiner* — Leonard S Liang
(74) *Attorney, Agent, or Firm* — Ronald E. Prass, Jr.; Prass LLP

(57) ABSTRACT

An imaging drum has an outer surface configured for receiving an ink image from a print head and transferring the image at a transfer nip. The imaging drum has a central channel extending through the drum along a central longitudinal axis. An inner drum surface faces the channel and includes surface alterations that increase or decrease at least one of surface emissivities and heat absorption to mitigate thermal influences on the imaging drum and control temperature variability along the imaging drum.

17 Claims, 2 Drawing Sheets

(56) References Cited

U.S. PATENT DOCUMENTS

| | | | |
|---|---|---|---|
| 7,860,418 B2* | 12/2010 | VanKouwenberg et al. | 399/69 |
| 8,708,447 B2* | 4/2014 | Poxon | 347/17 |
| 2004/0017455 A1* | 1/2004 | Kremers et al. | 347/103 |
| 2006/0290761 A1* | 12/2006 | Cellura et al. | 347/103 |
| 2007/0024687 A1* | 2/2007 | Park et al. | 347/103 |
| 2007/0076080 A1* | 4/2007 | Knierim et al. | 347/103 |
| 2010/0231674 A1* | 9/2010 | Domoto et al. | 347/103 |
| 2012/0013691 A1* | 1/2012 | Harris et al. | 347/101 |

* cited by examiner

IMAGING DRUM SURFACE EMISSIVITY AND HEAT ABSORPTION CONTROL METHODS, APPARATUS, AND SYSTEMS FOR REDUCTION OF IMAGING DRUM TEMPERATURE VARIATION

FIELD OF DISCLOSURE

The disclosure relates to methods, apparatus, and systems for controlling temperature variation along an imaging member such as a drum-type imaging member. In particular, the disclosure relates to methods, apparatus, and systems for controlling imaging drum temperature variability by controlling surface emissivity and/or heat absorption.

BACKGROUND

An imaging member, such as a drum-type imaging member, may be arranged in a printing system used for offset printing adjacent to a printhead. The printhead may be a full width printhead or array configured to deposit marking material such as ink toner or solid ink onto an outer surface of the imaging drum.

During a print job, the imaging member may be maintained at a temperature that is compatible with the inks being used, which tends to produce satisfactory image quality, image transfer, and ink durability. For example, for transfer of typical inks, an imaging drum temperature should be above an ambient temperature. Some printing systems may include one or more heaters configured to heat the imaging member. Energy efficiency demands favor a system that heats as uniformly as possible, and wherein heaters and the print head are configured to be turned off during non-print-ready states.

SUMMARY

An imaging member in a printing system for offset printing may be subject to thermal influences from several sources that must be counteracted to control variability of temperature along the imaging member. Accordingly, the imaging member may be heated to a temperature above an ambient temperature, such as a temperature in a range of 50 to 60° C., that is sufficient for adequate image transfer of particular ink for a print job. Further, a first region of a surface of the imaging member and a second region of a surface of the imaging member may be heated at substantially different or equal temperatures.

An imaging member for printing in, e.g., a solid ink offset printing system may be a drum or other suitable imaging member. The drum may have a first surface and a second surface; a first or outer surface configured for image transfer, and second or inner surface. For example, the imaging drum may have inner circumferential surface defining a channel that extends longitudinally, and an outer circumferential surface configured for solid ink image transfer in solid ink offset printing applications.

An imaging member in accordance with an embodiment may include an inner or second surface that is configured for minimal temperature variation along the imaging member. In offset printing systems having an imaging member in accordance with an embodiment, the imaging member may be arranged in operable proximity to a print head or print head array. The print head may be configured to deposit marking material such as solid ink, aqueous inks, UV curable inks, gel inks, or other molten and/or fluid materials onto the first surface of the imaging member as the imaging member rotates about a central longitudinal axis. In non-sleep or non-off states, for example, the print head may be heated to a temperature above ambient temperature, such as 115° C., and may radiate thermal energy, which may be absorbed at affected regions of the drum. Further, the imaging member may radiate heat at particular portions, regions, or areas. For example, the imaging member may radiate thermal energy to printing system components such as frame, and hubs at either end of the imaging member, with respect to the central rotational and/or longitudinal axis. Air flow through a longitudinal, centrally extending channel defined by the inner surface of the drum may, for example, lower the temperature of a region of the inner circumferential surface of the imaging drum. The outer surface of the drum could be formed of a material having a low or high emissivity itself.

This set of conditions may cause an imbalance in temperature across the imaging drum. For example, the ends of the imaging drum may become cooler due to heat sink effects from support elements and air flow exposure, the central region may become warmer due to boundary conditions and thermal influence from the printhead, and convective air flow through the drum may make one end hotter than the other with a gradient in between. To warm the imaging drum to quickly to attain an imaging ready state, the cooler zones should be heated to an optimal temperature in a manner that accounts for the faster warm-up rate and elevated relative temperature of the inner circumferential regions of the imaging drum ends, for example, which typically results in a wider than desired temperature spread.

Surface emissivity and thermal absorption control methods, apparatus, and systems for reduction of imaging drum temperature variation are provided. An imaging member for printing in accordance with an embodiment may comprise a first surface, the first surface being an imaging surface; and a second surface, the second surface including a surface alteration configured to control temperature variability across the imaging member. The second surface may circumferentially extend to form a cylindrical shape, the circumferentially extending cylindrical shaped second surface defining a channel, whereby air may contact the second surface.

The imaging member may be any member suitable for imaging in solid ink offset printing, such as drum. The drum may be rotatable about a central longitudinal axis, the first surface including an outer surface of the drum, and the second surface including an inner surface of the drum, the inner surface of the drum defining a channel extending centrally through the drum along the central longitudinal axis.

In an embodiment, the surface alteration may include a coating that increases or decreases at least one of a surface emissivity and a heat absorption level of the imaging member. In an embodiment, the surface alteration may include a change in surface roughness effected by, for example, polishing or roughening (i.e. sand blasting, sanding, etc.). In an embodiment, the surface alteration may include a pattern formed on the second surface, whereby at least one of a surface emissivity and a heat absorption level of the imaging member are controlled. The pattern may be formed by etching, or deposition, for example, and may comprise raised and/or depressed areas of the imaging member surface. In another embodiment, the surface alteration may include both a coating that increases or decreases at least one of a surface emissivity and a heat absorption level of the imaging member; and a pattern formed on the second surface, whereby at least one of a surface emissivity and a heat absorption level of the imaging member is controlled.

In an embodiment, the surface alteration may be a first surface alteration, and the second surface may further comprise a first region having the first surface alteration; and a second region having a second surface alteration, the first surface alteration and the second surface alteration being configured to control temperature variability across the imaging member. In another embodiment, the second surface may include a third surface region. The third surface region may include no surface alteration, or may include one or more surface alterations. For example, the third surface region may be a central drum region configured for enhanced thermal emissivity for counteracting heat from the printhead. The first and second surface regions may constitute end zones of the imaging member that are configured for enhanced heat absorption to counteract heat loss to air flow and system components.

In an embodiment, the third region may include a boundary that interlocks with a boundary of at least one of the first region and the second region. The surface alteration(s) of the interlocking surface regions may be configured for control of temperature variation, enhanced by rotation of, e.g., the imaging drum with respect to adjacent thermal influences. The number of regions or types of patterns that may be used to effect different and desired emissivities on any given surface may be limitless.

In an embodiment, the first surface alteration and second surface alteration being at least one of a coating and a pattern formed on the second surface. In an embodiment, the imaging member may be a drum, the first surface being configured for image transfer. The imaging member may be, for example, a drum that is configured for rotation about a central longitudinal axis, the second surface being configured to circumferentially extend to define a cylindrical channel.

An embodiment of methods of reducing imaging drum temperature variation, the imaging drum having an imaging surface and an inner circumferential surface having at least a first region and a second region, may include altering a first region of the inner surface to control temperature variation along the imaging member. An embodiment may include altering a second region of the inner surface to control temperature variation along the imaging member.

In an embodiment, methods may include the altering the first region further comprising at least one of coating the inner surface and forming a pattern on the inner surface, whereby the at least one of the coating and the pattern control temperature variation along the imaging drum. The altering the first region may include the coating and the pattern being configured to at least one of increase or decrease at least one of an emissivity level and a heat absorption level. The altering the second region further comprising at least one of coating the inner surface and forming a pattern on the inner surface, whereby the at least one of coating and forming a pattern control temperature variation along the imaging drum.

In an embodiment of methods, the surface alteration may be coating comprising a black pigment, or may be a coating formed by anodizing. For example, the imaging member may include an inner surface comprising aluminum. The aluminum may be anodized to increase an emissivity of the surface. For example, non-anodized aluminum may have an emissivity of about 0.1, while anodized aluminum may have an emissivity of about 0.6 to 0.9. Painting a surface of the imaging member may increase an emissivity to about 0.95, while also increasing heat absorption. The surface may be masked in a pattern during anodization to vary the emissivity across different regions of the surface. Other methods of controlling emissivity include, for example, surface polishing to lower emissivity, sand blasting or sanding a surface to increase emissivity, plating surfaces with materials with high emissivity or high reflectance for low emissivity, vapor deposition of metals for low emissivity, and using adhesive laminates with high emissivity or high reflectance such as aluminized polyester tape for low emissivity, or polyimide tape for high emissivity. Some examples of materials with low emissivity include aluminum, nickel, gold, copper, brass, and chrome. Some examples of materials with high emissivity include paint, especially black, polymers, polyimides, glass, and oxide layers.

In an embodiment of systems, an offset printing system may have an imaging drum configured for controlled temperature variation. The system may include a print head for depositing ink onto an imaging surface; an imaging drum for receiving an image formed by ink deposited by the print head, and transferring the image, the imaging drum having a circumferentially extending outer surface, and a circumferentially extending inner surface, the outer surface being configured for the receiving and the transferring the image, the inner surface having a at least a first region and a second region, at least one of the first region and the second region being having a surface alteration formed on the inner surface, the surface alteration being configured to at least one of increase or decrease at least one of surface emissivity and heat absorption for controlling temperature variability along the imaging member, wherein the surface alteration comprises at least one of a coating and a pattern formed on the inner surface.

Exemplary embodiments are described herein. It is envisioned, however, that any systems that incorporate features of methods and systems described herein are encompassed by the scope and spirit of the exemplary embodiments.

DETAILED DESCRIPTION

Figure 1:
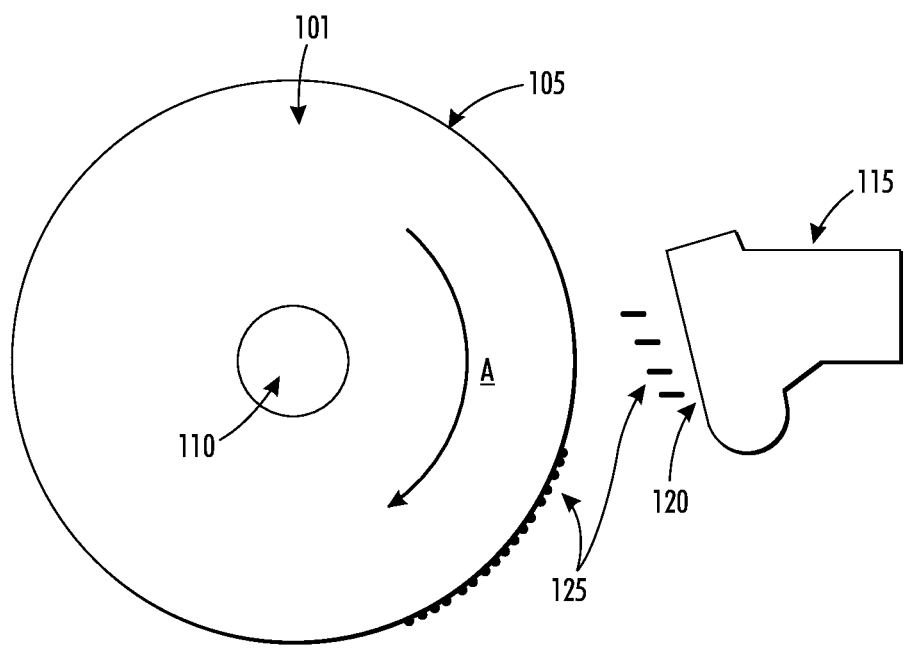
FIG. 1 shows a diagrammatical side view of an imaging drum and print head in accordance with a system of an exemplary embodiment.

Exemplary embodiments are intended to cover all alternatives, modifications, and equivalents as may be included within the spirit and scope of the methods, apparatus, and systems as described herein.

Reference is made to the drawings to accommodate understanding of surface emissivity control methods, apparatus, and systems for controlling imaging drum temperature variation. In the drawings, like reference numerals are used throughout to designate similar or identical elements. The drawings depict various embodiments of illustrative imaging drum surface emissivity and heat absorption control methods, apparatus, and systems for controlling imaging member temperature variation.

Methods, apparatus, and systems of embodiments may include surface alteration(s) along, e.g., on an inner surface of an imaging drum. The surface alterations may be configured to alter an emissivity and/or heat absorption level over areas of the drum to effectively reduce temperature variability. For example, improved system efficiency and thermal uniformity across functional drum regions may be attained by encouraging higher levels of emissivity or infra-red ("IR") heat absorption at cooler regions of the drum. Other wavelengths of radiation may also play a part in temperature control. Alternatively, a surface of the drum may be configured to encourage heat to radiate from warmer imaging drum regions using a surface treatment that accommodates reduced emissivity and high reflectance.

An ink offset printing system may include an imaging member such as an imaging drum. An imaging member may be any receiving member suitably structured for receiving an image in offset printing processes. The imaging drum may be heated by suitable heating devices, and may be heated to have a desired drum temperature variation range. For example, a preferred temperature variation range may be ±1° C. Another temperature variation range may be ±5° C. The extent of variation may be dependent on system state, imaging system environment, duty cycle, image content, and/or print job parameters. The imaging temperature may be maintained within a range of temperature variation when in an imaging ready state, such as the above-mentioned exemplary imaging surface temperature variation ranges.

The imaging member may be a drum configured to rotate about a central longitudinal axis. The imaging drum may include an outer circumferential surface for receiving an image, and an inner circumferential surface. For example, the outer circumferential surface may form a cylinder, and the inner circumferential surface may form a cylinder. The cylindrically shaped inner circumferential surface of the imaging drum may be concentrically disposed within the outer circumferential cylindrical surface, the outer cylindrical surface and the inner cylindrical surface forming an imaging drum wall.

The imaging drum may be configured to conform to particular requirements. For example, the drum may be constructed to have a wall thickness that imparts a stiffness sufficient to withstand transfix forces. Also, rotational velocity transitions of the imaging drum, including rapid starts and stops, requires minimal imaging member mass so that non-uniform imaging member temperatures may occur, and wall thickness may be limited accordingly.

An imaging member such as an imaging drum that is configured for offset printing may be associated with structural elements such as drum frame members, bearings, and hubs or "end bells" that cap the drum ends. End bells must be configured for permitting air flow, which may enter an airflow channel defined by the inner circumferential surface of the imaging drum. For example, air may enter the airflow channel at a first end of the drum, and exit at a second end of the drum, with respect to a central longitudinal axis and/or rotational axis of the drum. The air channel may extend through first and the second imaging drum ends. Air may enter at a first end of the airflow channel at a first temperature, and exit the airflow channel at a second temperature. For example, the second temperature may be elevated over the first temperature. Cool air flow may be required to address heat transfer that occurs when warming the printing system from a stand-by state, and periodically, or at low levels, when maintaining a print ready state.

The printhead may transfer heat to the imaging drum, e.g., a central portion of the drum located between the first end and the second end, when the printhead is maintained in, for example, a warm state, typically at about 70 to about 140° C., or above. System geometry and/or energy output across a length of the imaging drum may be configured to address temperature non-uniformity, but this may not be sufficient to address all thermal variability influences.

In accordance with embodiments, an inner surface of an imaging member, such as an inner circumferential surface of an imaging drum maybe altered and/or coated to effect higher or lower emissivity levels as desired. Accordingly, imaging member temperature variation may be reduced and/or controlled.

A typical imaging member such as a drum may be formed of Aluminum, and the Aluminum may be anodized. While outer drum surface textures and treatments contribute significantly to image quality and ink transfer media, inner drum surface alterations and treatment accommodate less concern for image quality reduction, and less limitations on media usage.

An aluminum surface may be effective for reflecting IR and other radiation. An emissivity level of bare aluminum is about 0.1 and can be as low as 0.02 if polished or vapor deposited. Anodizing the aluminum may increase emissivity to above 0.7. Painting a surface of an imaging member may increase emissivity to above 0.9, and as high as 0.99.

Surfaces with high radiative heat absorption also have high emissivity; therefore, the cooling rate may be as much as the heating rate of a given surface emissivity. However, this can be changed depending on the shape factor between the surface and surroundings (the incident angle that radiation is emitted from or absorbed into a surface, where perpendicular angles have the highest effective emissivity). For example, an aluminum drum with a polished outer surface for low emissivity will not absorb as much heat from the printheads, however, heat that is absorbed tends to stay absorbed. Tailoring the emissivity of the inner surface of the drum allows an internal radiative heater or heat source to heat specific regions of the drum faster; but, the heat may be substantially retained because, for example, the surrounding surfaces that are not adjacent have an equivalent emissivity (the inside center of a long tube with uniform emissivity may have negligible radiative heat loss while the ends of the same tube may have moderate to high heat loss).

An inner circumferential surface of an imaging member may be configured to exhibit desired emissivity and/or heat absorption. For example, a region of the inner circumferential surface may be provided with a particular surface alteration, such as paint, or a surface pattern formed on the region of the inner surface that affects a desired emissivity for the region. Accordingly, one or more regions of the inner surface of the imaging member may be selectively altered to achieve desired absorption and/or emissivity to, for example, maintain a desired temperature variation across the imaging member.

Emissivity values of certain materials, surface treatments, and/or coatings for particular areas or regions of an imaging member, and for particular patterns that are complementary to primary thermal influences for a given printer system may be predetermined or known. Surface treatments, coatings, and/or patterns for achieving high or low emissivity coefficients may be formed by polishing, anodizing, depositing, oxidation, lining, and painting, for example. Masking methods now known or later developed may be implemented to form patterns that contribute to thermal uniformity, and oxidation or anodization may be used to apply coatings. Surface treatments may be symmetrical or asymmetrical across the imaging member inner circumferential surface, depending on the thermal behavior of the system.

The imaging member may be formed of aluminum. Alternatively, the imaging member may be formed of another suitable material. For example, the imaging member may be formed of a material that has a thermal conductivity that is high enough to minimize significant temperature transitions from zone to zone, or region to region, across an inner circumferential surface of an imaging member formed as, for example, a drum. Alternatively, the imaging member may be formed of steel for strength, in which the thermal conductivity is worse, making thermal uniformity worse.

FIG. 1 shows an imaging member of an offset printing system in accordance with an exemplary embodiment. In particular, FIG. 1 shows a diagrammatical side view of an imaging member formed as a drum. The imaging drum 101 includes an outer circumferential surface 105, and an inner circumferential surface 110. The drum may be formed of aluminum or other suitable material having a thermal conductivity sufficient to minimize temperature transitions from a first region of the imaging drum 101 to a second region of the imaging drum 101. There may be barriers such as strength that limit the use of such high thermal conductivity materials.

The outer circumferential surface 105 may be formed to accept an image, and carry the image for transfer to a substrate such as media or another image transfer member. In particular, the outer surface 105 may be configured to receive ink such as a solid ink. The ink may be deposited in the form of an image on the outer surface 105. The deposited image may be carried past one or more processing stations (not shown), and may be carried to a transfer or transfix nip at which the image is transferred from the outer surface 105 to a substrate surface (not shown).

FIG. 1 shows a print head 115 that is configured to eject ink from a print head output 120 to deposit the ink 125 onto the outer imaging drum surface 105. The ink may be, for example, solid ink, toner, aqueous inks, UV curable inks, gel inks, or other molten and/or fluid materials, or other suitable marking material. After the ink 125 is deposited onto the outer surface 105 of the imaging drum 101, the ink 125 may be carried to a transfer or transfix nip to be transferred from the imaging member to a substrate such as media (not shown).

The imaging drum 101 may include an inner circumferential surface 110. The imaging drum shown in FIG. 1 includes an outer surface 105 that forms an outer cylindrical shape, and an inner surface 110 that forms an inner cylindrical shape that is concentrically arranged within the cylindrically shaped outer surface 105. The inner surface 105 and the outer surface 110 may form an imaging member wall that includes a hollow channel extending through the imaging drum along a longitudinal axis of the imaging drum 101, the channel being defined by the inner surface 110. The hollow channel in FIG. 1 is positioned at about along a central longitudinal axis of the imaging member 105. The imaging member 105 of FIG. 1 may be rotatable about the central longitudinal axis. For example, the imaging member may be rotated in the direction shown by the arrow A.

The imaging member 101 may be configured so that air may flow through the air channel to contact an inner circumferential surface 110 of the imaging member 101. The inner surface 110 may include surface alterations such as coatings and/or surface patterns that enable a desired thermal emissivity and/or thermal absorption. The surface alterations may be included at one or more regions of the inner surface 110, and may include coating(s) and/or surface pattern formations. The imaging member 101 may be associated with hubs at either or both ends of the hollow channel. The air flow and hub(s), among other adjacent structural features not shown, may contribute to a heat sink effect that influences emissivity and/or heat absorption. A heating element may be disposed within the channel for heating the imaging member 101 from an inner surface 110 side. Alternatively, the imaging drum 101 may be heated from an opposite side of the imaging member 101, for example, from the side of the outer surface 105.

Surface patterns disposed on an inner circumferential surface 110 of the imaging member 101 may be arranged to control and optimize thermal uniformity. For example, patterns may be any shape or symmetry as needed for a particular print job application. Air flow and hub heat sink effects tend to be apparent at either end of the imaging member 101, with respect to the central longitudinal axis. Accordingly, the end regions of the drum may be cooler than a central region of the drum. In such an arrangement, the drum end regions may require more energy to heat to a desired level, e.g., a temperature appropriate for a print ready state, than the drum central region. The inner circumferential surface of such a drum may be altered to reduce temperature variation by increasing heat absorption and/or decreasing emissivity at the drum end regions, and decreasing heat absorption and/or increasing emissivity at the central region, for example.

FIGS. 2A-2D show exemplary surface alteration patterns that may be implemented on an inner circumferential surface of an imaging member such as an imaging drum in accordance with methods, apparatus, and systems of embodiments. The different patterns and combinations of patterns are each configured for reducing temperature variation for imaging members that are each subject to particular thermal influences that require higher and/or lower emissivity and/or absorption levels at different regions of the imaging member for reducing and/or minimizing temperature variation.

Figure 2A:
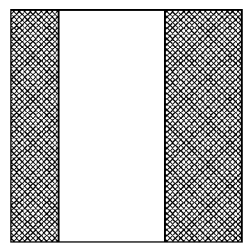
FIG. 2A shows a diagrammatical representation of an exemplary surface alteration of an inner circumferential surface of an imaging drum in accordance with an exemplary embodiment.

For example, FIG. 2A shows a surface pattern on an inner circumferential surface of an imaging member. The patterning is located at a first end and a second end of the imaging member to address heat loss or improve heat absorption at the first and second ends as necessary to reduce and/or minimize temperature variation along the imaging member. The first end of imaging member includes a pattern that covers and area of the inner imaging drum surface that is greater than an area covered by a surface pattern at the second end of the imaging member. The heat loss, before introducing the surface pattern, was determined to affect an area at the first end of the imaging member inner surface that is greater than the area affected by heat loss at a second end of the inner surface of imaging member. Accordingly, the surface pattern applied to the inner surface covers a greater area at the first end of the imaging member inner surface than the pattern at the second end.

Figure 2B:
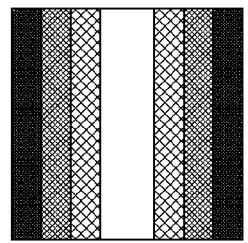
FIG. 2B shows a diagrammatical view of an exemplary surface alteration of an inner circumferential surface of an imaging drum in accordance with an exemplary embodiment.

FIG. 2B shows a surface pattern at a first end of an inner circumferential surface of an imaging member that covers a greater area than a surface pattern located at a second end of the inner surface of the imaging member. The patterns may be implemented to address heat loss at ends of the imaging member and resulting temperature variation across the imaging member. The pattern at the first end is configured to increase surface emissivity and/or heat absorption to a first level, a second level, and a third level, as illustrated by the light, medium, and dark pattern shading. Similarly, the surface pattern at the second end of the inner surface of the imaging member is configured to increase emissivity and/or heat absorption to the second level, and to the third level.

Alternatively, the surface pattern at the second end may be configured to increase emissivity of the imaging member to a degree that is different than one or more of the first level, second level, and third level effected by the surface pattern located at the first end of the imaging member. The surface patterns may be configured to increase emissivity and/or heat absorption as necessary to counteract thermal influences that cause temperature variation along the imaging member. The patterning may be implemented in combination with a coating such as a black pigment coating.

Figure 2C:
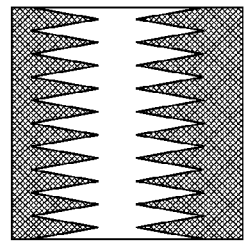
FIG. 2C shows a diagrammatical view of an exemplary surface alteration of an inner circumferential surface of an imaging drum in accordance with an exemplary embodiment.

FIG. 2C shows another exemplary surface pattern arranged on an inner circumferential surface of an imaging member. The surface pattern shown in FIG. 2C may encourage heat loss or increase emissivity to a first degree or level at a first end and a second end of an imaging member inner surface, while accommodating different, e.g., lesser increases in emissivity at regions of the inner surface toward the central region of the imaging member, where the pattern is configured so that rotation of the imaging member results in an alternating surface pattern with respect to sources of thermal influence.

Figure 2D:
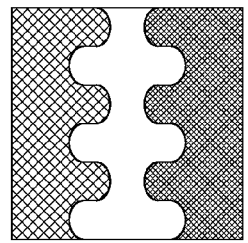
FIG. 2D shows a diagrammatical view of an exemplary surface alteration of an inner circumferential surface of an imaging drum in accordance with an exemplary embodiment.

FIG. 2D shows another exemplary surface pattern arranged on an inner circumferential surface of an imaging member. The surface pattern shown in FIG. 2D may encourage heat loss or increase emissivity to a first level at a first end of the imaging member, a second level at a second end of the imaging member, with lesser increases of emissivity at regions of the inner surface toward the central region of the imaging member wherein the pattern is configured so that rotation of the imaging member results in an alternating surface pattern.

While an imaging member surface may include surface patterns as shown in FIGS. 2A-B for addressing heat loss toward hubs and/or either end of the inner surface due to, for example, air flow, surface patterns may also be configured to address other thermal influences as appropriate for a particular application. For example, in high volume print production where a print job may require nearly constant, repetitive imaging, the imaging member central region may become warmer than the end regions, and retain heat. Accordingly, it may be appropriate to alter an inner surface of the imaging member by, for example, introducing a surface pattern that discourages heat loss at the first end and second end while encouraging heat loss from the central region of the imaging member.

Emissivity control using coating and/or physical surface patterns on an inner circumferential surface of an imaging member improve thermal uniformity across an imaging member, and also improves power efficiency by reducing power requirements. For example, imaging member regions having surface alterations may be configured to warm up from a non-print-ready state more quickly than non-altered regions of the imaging member. Similarly, decreasing radiant heat absorption by way of surface alterations in a region that is typically easily heated, such as a central region of the imaging member, may narrow a temperature gradient range. Accordingly, power and time necessary to attain operational offset printing temperatures, from standby, sleep, or other non-printing states, may be decreased using emissivity and heat absorption control methods, apparatus and systems for controlling imaging member temperature variation. An example of improved energy savings includes an imaging drum for which the minimum temperature is more critical than the maximum temperature. Without emissivity control, a significant thermal gradient may require the coldest imaging member regions to be at the minimum temperature, while the higher-temperature regions dissipate more heat than necessary. Emissivity control reduces the thermal gradient, in turn reducing a maximum temperature of regions of the drum, saving energy.

While methods, apparatus, and systems for variation are described in relationship to exemplary embodiments, many alternatives, modifications, and variations would be apparent to those skilled in the art. Accordingly, embodiments of methods, apparatus, and systems as set forth herein are intended to be illustrative, not limiting. There are changes that may be made without departing from the spirit and scope of the exemplary embodiments.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A solid ink offset printing imaging drum having a cylindrical wall for printing in a solid ink offset printing system having a print head configured to eject ink from an output thereof, comprising:
   a first surface of the cylindrical wall configured for fluid communication with the print head of the solid ink offset printing system, the first surface being an image carry and transfer surface configured to receive an ink image from the print head, carry the image to a transfer nip of the solid ink offset printing system, and transfer the image to a substrate; and
   a second surface of the cylindrical wall being an inner cylindrical surface, the second surface including a surface alteration having an etched portion configured to control temperature variability across the imaging drum, the second surface defining an inner cylinder channel.

2. The imaging drum of claim 1, wherein the second surface circumferentially extends to form a cylindrical shape, the circumferentially extending cylindrical shaped second surface defining a channel, whereby air may contact the second surface.

3. The imaging drum of claim 1, wherein the imaging drum is rotatable about a central longitudinal axis, the first surface including an outer surface of the drum, and the second surface including an inner surface of the drum, the inner surface of the drum defining a channel extending centrally through the drum along the central longitudinal axis.

4. The imaging drum of claim 1, the surface alteration further comprising:
   a coating that increases or decreases at least one of a surface emissivity and a heat absorption level of at least one of the first surface and the second surface the imaging drum.

5. The imaging drum of claim 4, the coating being one of a pigment coating and an anodized aluminum coating.

6. The imaging drum of claim 1, the surface alteration further comprising:
   a pattern formed on the second surface, whereby at least one of a surface emissivity and a heat absorption level of the imaging drum is controlled.

7. The imaging drum of claim 6, the pattern including raised and depressed surface areas of said second surface.

8. The imaging drum of claim 1, the surface alteration further comprising:
   a coating that increases or decreases at least one of a surface emissivity and a heat absorption level of the imaging drum; and
   a pattern formed on the second surface, the pattern being different than the coating, wherein at least one of a surface emissivity and a heat absorption level of the imaging drum is controlled, the pattern including raised and depressed surface areas of said second surface, the raised surface area being an extension of the cylindrical wall having the same material of the cylindrical wall, the depressed surface areas being the etched portion of the second surface formed by etching.

9. The imaging drum of claim 1, the surface alteration being a first surface alteration, the second surface further comprising:
 a first region having the first surface alteration; and
 a second region having a second surface alteration, the first surface alteration and the second surface alteration being configured to control temperature variability across the imaging drum.

10. The imaging drum of claim 9, the second surface further comprising:
 a third surface region.

11. The imaging drum of claim 10, the third region further comprising the third region having a boundary that interlocks with a boundary of at least one of the first region and the second region.

12. The imaging drum of claim 9, the first surface alteration and second surface alteration being at least one of a coating and a pattern formed on the second surface.

13. The imaging drum of claim 12, wherein the imaging drum is configured for rotation about a central longitudinal axis, the second surface being configured to circumferentially extend to define a cylindrical channel.

14. The imaging drum of claim 1, said imaging drum being configured for an offset printing system, the offset printing system including a print head configured to deposit ink onto the first surface of said imaging drum.

15. In an offset printing system having a print head configured to eject ink from an output thereof, an ink offset printing imaging drum having a cylindrical wall for printing, the imaging drum comprising:
 a first surface of the cylindrical wall configured for fluid communication with the print head of the solid ink offset printing system, the first surface being an image carry and transfer surface configured to receive an ink image from the print head, carry the image to a transfer nip of the solid ink offset printing system and transfer the image to a substrate; and
 a second surface of the cylindrical wall being an inner cylindrical surface, the second surface including a surface alteration having an etched portion configured to control temperature variability across the imaging drum, the second surface defining an inner cylinder channel.

16. The imaging drum of claim 15, the surface alteration further comprising:
 a coating that increases or decreases at least one of a surface emissivity and a heat absorption level of the imaging drum; and
 a pattern formed on the second surface, the pattern being different than the coating, wherein at least one of a surface emissivity and a heat absorption level of the imaging drum is controlled, the pattern including raised and depressed surface areas of said second surface, the raised surface area being an extension of the cylindrical wall formed by the material of the cylindrical wall, the depressed surface areas being the etched portion of the second surface formed by etching.

17. The imaging drum of claim 16, the coating being one of a pigment coating and an anodized aluminum coating.

* * * * *